(12) United States Patent
Seo et al.

(10) Patent No.: US 9,885,581 B2
(45) Date of Patent: *Feb. 6, 2018

(54) SYSTEM AND METHOD FOR DISPLAYING THREE-DIMENSIONAL MAP BASED ON ROAD INFORMATION

(71) Applicant: Hyundai Motor Company, Seoul (KR)

(72) Inventors: Jung Kak Seo, Seoul (KR); Yun Han Kim, Seoul (KR); Dae Myung Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 274 days.

This patent is subject to a terminal disclaimer.

(21) Appl. No.: 14/341,363

(22) Filed: Jul. 25, 2014

(65) Prior Publication Data

US 2016/0025512 A1 Jan. 28, 2016

Related U.S. Application Data

(63) Continuation of application No. 12/988,972, filed as application No. PCT/KR2008/003791 on Jun. 29, 2008, now Pat. No. 8,803,874.

(30) Foreign Application Priority Data

Apr. 23, 2008 (KR) .................. 10-2008-0037765

(51) Int. Cl.
*G06T 15/00* (2011.01)
*G01C 21/36* (2006.01)
(Continued)

(52) U.S. Cl.
CPC .......... *G01C 21/3638* (2013.01); *G06T 15/40* (2013.01); *G06T 17/05* (2013.01)

(58) Field of Classification Search
None
See application file for complete search history.

(56) References Cited

U.S. PATENT DOCUMENTS 5,748,109 A * 5/1998 Kosaka ............. G01C 21/3635
340/988
5,999,879 A 12/1999 Yano
(Continued)

FOREIGN PATENT DOCUMENTS

EP 1126245 A2 8/2001
JP 2001-027535 A 1/2001
(Continued)

OTHER PUBLICATIONS

Supplementary European Search Report dated Dec. 6, 2011 in European Patent Application No. 08778461.7 dated Jun. 29, 2008.
(Continued)

*Primary Examiner* — Andrew G Yang
(74) *Attorney, Agent, or Firm* — McDermott Will & Emery LLP

(57) ABSTRACT

A system and method of displaying a three-dimensional (3D) map based on road information. A display system, including: a culling area determination unit to determine a culling area based on road information; a data conversion unit to convert data of at least a portion of objects displayed on the culling area; and a display unit to display at least the portion of the objects based on the converted data.

23 Claims, 9 Drawing Sheets

(51) Int. Cl.
  *G06T 15/40*  (2011.01)
  *G06T 17/05*  (2011.01)

(56) References Cited

U.S. PATENT DOCUMENTS

| | | | |
|---|---|---|---|
| 6,144,318 A * | 11/2000 | Hayashi | G01C 21/3658 340/988 |
| 6,169,552 B1 | 1/2001 | Endo et al. | |
| 6,710,774 B1 | 3/2004 | Kawasaki et al. | |
| 7,643,654 B2 | 1/2010 | Fujiwara et al. | |
| 7,974,781 B2 | 7/2011 | Emoto et al. | |
| 2007/0172147 A1 | 7/2007 | Fujiwara et al. | |
| 2011/0043519 A1* | 2/2011 | Seo | G01C 21/36 345/419 |
| 2013/0083015 A1* | 4/2013 | Hernandez Esteban | G06T 15/00 345/419 |
| 2014/0071119 A1* | 3/2014 | Piemonte | G06T 17/05 345/419 |

FOREIGN PATENT DOCUMENTS

| | | |
|---|---|---|
| JP | 2001-209301 A | 8/2001 |
| JP | 2005-345299 A | 12/2005 |
| JP | 2007-010356 A | 1/2007 |
| JP | 2007-026201 A | 2/2007 |
| JP | 2007-057809 A | 3/2007 |

OTHER PUBLICATIONS

U.S. Office Action dated Oct. 12, 2012 issued in U.S. Appl. No. 12/988,972.

U.S. Office Action dated Apr. 17, 2013 issued in U.S. Appl. No. 12/988,972.

U.S. Office Action dated Aug. 28, 2013 issued in U.S. Appl. No. 12/988,972.

Notice of Allowance dated Apr. 2, 2014 issued in U.S. Appl. No. 12/988,972.

* cited by examiner

SYSTEM AND METHOD FOR DISPLAYING THREE-DIMENSIONAL MAP BASED ON ROAD INFORMATION

This application is a continuation of U.S. patent application Ser. No. 12/988,972 filed in the United States on Oct. 21, 2010, now U.S. Pat. No. 8,803,874, which claims benefit of priority from Korean PCT Application No. PCT/KR2008/003791, filed on Jun. 29, 2008, which are both hereby incorporated by reference in their entirety.

TECHNICAL FIELD

The present invention relates to a three-dimensional (3D) map display system and method based on road information, and more particularly, to a 3D map display system and method which converts and displays data of objects near a road based on road information such as a width and a lane of the road.

BACKGROUND ART

Displaying buildings, mountains, hills, and the like may enrich an image in a three-dimensional (3D) map. At the same time, buildings, mountains, hills, and the like may obstruct a view and prevent particular information from being completely displayed. For example, when navigation information is provided through a 3D map, information about a vehicle, starting point, and destination may not be accurately provided due to buildings.

Accordingly, a technology to enable buildings, mountains, and hills as well as a vehicle, starting point, and destination to be appropriately displayed is required. Thus, a system and method of efficiently displaying an object such as a building is provided.

DISCLOSURE OF INVENTION

Technical Goals

An aspect of the present invention provides a display system and method which determines a culling area based on road information such as a width and a lane of a road, converts data of at least a portion of objects, displayed on the culling area, to enable at least the portion of the objects to be removed or blended, and thereby may enable guidance information to be completely displayed and efficiently display objects.

An aspect of the present invention also provides a display system and method which dynamically determines a process of generating an object such as a building based on a width of a road using a virtual figure that may be generated based on road information, and thereby may efficiently display the object.

An aspect of the present invention also provides a display system and method which divides a culling area into a plurality areas, removes a portion of an object located adjacent to a road, blends a portion of an object located far away from the road, and thereby may efficiently display the objects.

Technical Solutions

According to an aspect of the present invention, there is provided a display system, including: a culling area determination unit to determine a culling area based on road information; a data conversion unit to convert data of at least a portion of objects displayed on the culling area; and a display unit to display at least the portion of the objects based on the converted data.

The road information may include information about at least one of a width and a lane of a road.

The culling area determination unit may determine an area corresponding to a virtual figure capable of being generated as the culling area based on the road information.

The culling area determination unit may include a width determination unit to determine a width of a road, and a weight providing unit to provide a predetermined weight for the determined width. In this instance, the culling area determination unit may determine a rectangular area as the culling area, and the rectangular area may have the weighted width as a side.

The data conversion unit may convert the data to enable at least a portion of each of at least the portion of the objects to be removed.

The data conversion unit may convert the data to enable at least a portion of each of at least the portion of the objects to be blended.

The display system may further include an area division unit to divide the culling area into a plurality of areas. The data conversion unit may differently convert data of an object depending on the divided area. In this instance, the different conversion may include data conversion to remove at least a portion of objects and data conversion to blend at least the portion of the objects. Also, the area division unit may divide the culling area into the plurality of areas generated by providing weights different from each other for the width of the road.

At least the portion of the objects may include an object obstructing a road from view.

According to an aspect of the present invention, a display method, including: determining a culling area based on road information; converting data of at least a portion of objects displayed on the culling area; and displaying at least the portion of the objects based on the converted data.

Advantageous Effects

According to an embodiment of the present invention, a display system and method determines a culling area based on road information such as a width and a lane of a road, converts data of at least a portion of objects, displayed on the culling area, to enable at least the portion of the objects to be removed or blended, and thereby may enable guidance information to be completely displayed and efficiently display objects.

Also, according to an embodiment of the present invention, a display system and method dynamically determines a process of generating an object such as a building based on a width of a road using a virtual figure that may be generated based on road information, and thereby may efficiently display the object.

Also, according to an embodiment of the present invention, a display system and method divides a culling area into a plurality areas, removes a portion of an object located adjacent to a road, blends a portion of an object located far away from the road, and thereby may efficiently display the objects.

BRIEF DESCRIPTION OF THE DRAWINGS

These and/or other aspects, features, and advantages of the invention will become apparent and more readily appreciated from the following description of embodiments, taken in conjunction with the accompanying drawings of which.

BEST MODE FOR CARRYING OUT THE INVENTION

Figure 1:
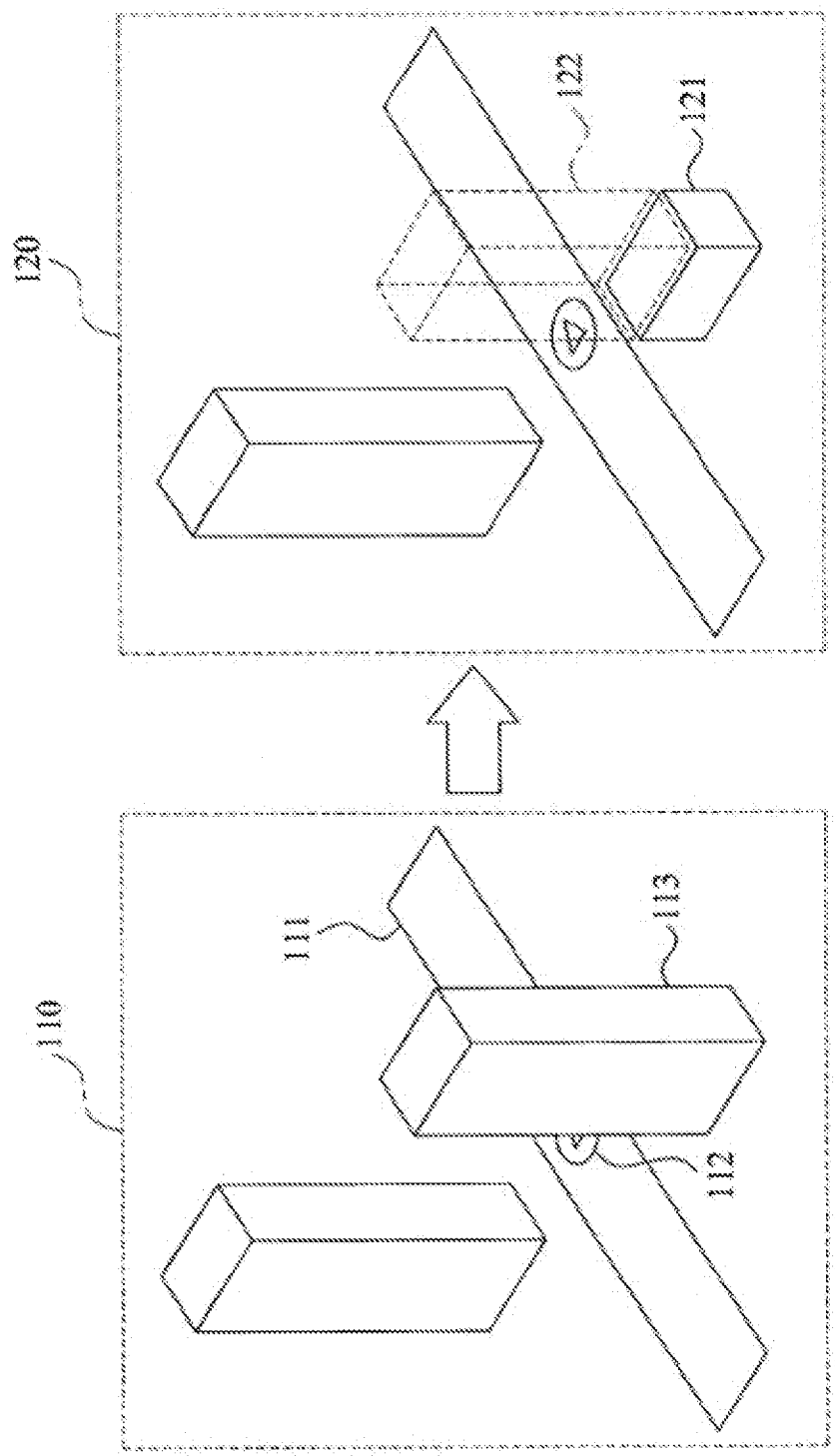
FIG. 1 is a diagram illustrating a general example of a display method according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a general example of a display method according to an embodiment of the present invention. FIG. 1 illustrates a general example of the display method in a navigation environment of a vehicle.

It is illustrated that a first building 113 obstructs a location 112 of a vehicle driving on a first road 111 from view in a first map 110 simply displayed three-dimensionally (3D). In this instance, at least a portion 122 of a second building 121 may be removed or blended as illustrated in a second map 120 of FIG. 2. Accordingly, necessary information may be efficiently displayed. Here, an area to remove or blend a portion of an object may be determined to dynamically adjust a culling area.

Figure 2:
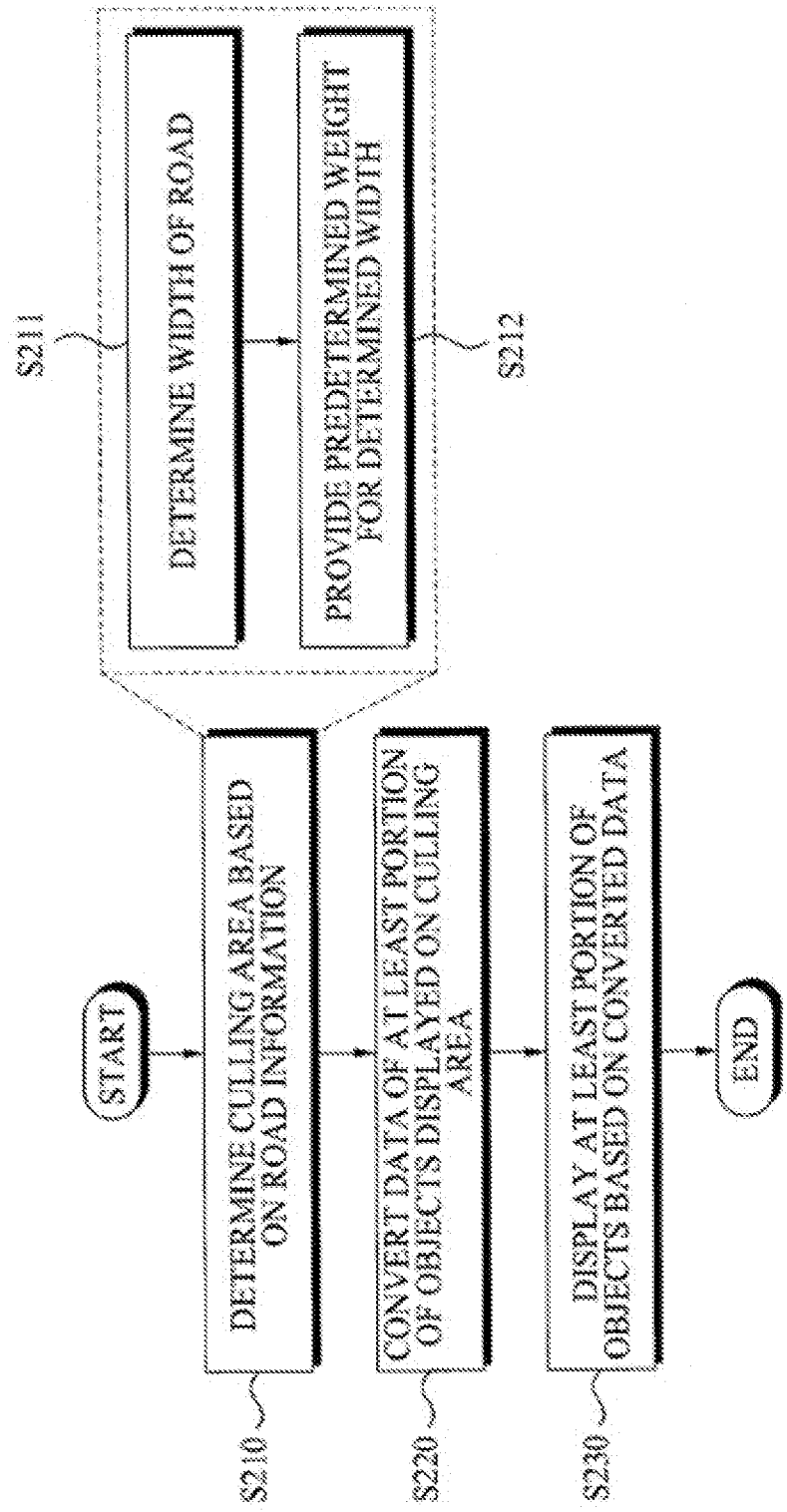
FIG. 2 is a flowchart illustrating a display method according to an embodiment of the present invention.

FIG. 2 is a flowchart illustrating a display method according to an embodiment of the present invention. Here, each operation of the display method may be embodied by a display system according to an embodiment of the present invention.

In operation S210, the display system may determine a culling area based on road information. The road information may include information about at least one of a width and a lane of a road. That is, the display system may determine the culling area based on the width or the lane of the road. For example, as the width of the road increases or a number of lanes of the road increases, the culling area may be determined to be larger.

In this instance, the display system may determine, as the culling area, an area corresponding to a virtual figure that may be generated based on the road information. For example, the display system may determine an area of a square as the culling area. The square may have a side with a length where a predetermined weight is provided for the width of the road. Also, the culling area may be determined as a cube or an area corresponding to a hemisphere on a condition that the culling area is in 3D. In this instance, the cube may start from ground level and have the weighted length as a side, and the area corresponding to the hemisphere may have the weighted length as a radius and start from ground level. That is, the culling area may be determined as all virtual figures that may be generated based on the road information.

As an example, the culling area may be determined based on a particular point such as a location of a vehicle in a navigation environment. That is, the culling area may be determined based on the road information and the location of the vehicle, and a culling area determination unit 910 may change the culling area based on a change of the location of the vehicle. Specifically, since the location of the vehicle continuously changes in the navigation environment, the culling area may change based on the location of the vehicle As illustrated in FIG. 2, the determining in operation S210 may include determining in operation S211 and providing in operation S212.

In operation S211, the display system may determine a width of a road where the vehicle is driving. In this instance, the display system may directly determine the width of the road using map data including information about a width of a road, or calculate the width of the road based on information about a lane of the road. The information about the lane of the road may be obtained from the map data.

In operation S212, the display system may provide a predetermined weight for the determined width. In this instance, the display system may determine the culling area based on the weighted width and the location of the vehicle. For example, when the determined width is 18 m, the display system may determine, as the culling area, a rectangular area having a side of 28 m and a center corresponding to the location of the vehicle. The length of the side, 28 m, may be obtained by summing the determined width, 18 m, and 10 m which is previously set as the weight. The predetermined weight may be set as appropriate. Also, the display system may determine a circular area or an area corresponding to a space figure as the culling area. The circular area may have the weighted width as a radius, and the space figure may start from ground level and have the weighted width as a side. Also, the display system may determine an area corresponding to a space figure as the culling area. In this instance, the area corresponding to the space figure may start from ground level and be based on a circular figure having the weighted width as a radius. That is, all areas corresponding to the virtual figure that may be generated based on the road information may be determined as the culling area as described above.

In operation S220, the display system may convert data of at least a portion of objects displayed on the culling area. In this instance, at least the portion of the objects may include an object obstructing the road from view. That is, data of all objects included in the culling area may be converted, or the object obstructing the road from view may be selected from all the objects and data of the selected object may be converted. For this, the display system may convert the data to enable at least the portion of the objects to be removed. Specifically, the display system may prevent the objects included in the culling area from being displayed, and also convert the data to enable at least the portion of the objects to be removed to obtain a view. For example, a single building included in the culling area may be entirely removed, and only a portion of the building may be removed to prevent the road from being obstructed from view. Also, the display system may convert the data to enable at least the portion of the objects to be blended without removing. Here, the data of the objects may include modeling data about the objects.

Also, the display method may further include an operation of dividing the culling area into a plurality of areas, which is not illustrated in FIG. 2. When the culling area is divided, the display system may differently convert the data depending on each of the divided areas. For example, when the culling area is divided into two areas, the display system may apply a data conversion for removing at least the portion of the objects to an area of the two areas, and apply a data conversion for blending at least the portion of the object to another area.

In this instance, the plurality of areas may be generated by providing weights different from each other for the width of the road. For example, when the culling area is a rectangular area determined by providing the predetermined weight, 10 m, for the width of the road, the culling area may be divided into two areas. The two areas may be two rectangular areas generated by providing a weight of 5 m for the width of the road.

In operation S230, the display system may display at least the portion of the objects based on the converted data. Specifically, the display system may convert data obstructing particular information from view and display at least the portion of the objects on a map screen based on the converted data. Accordingly, the display system may efficiently display the object to enable the particular information to be completely displayed.

Figure 3:
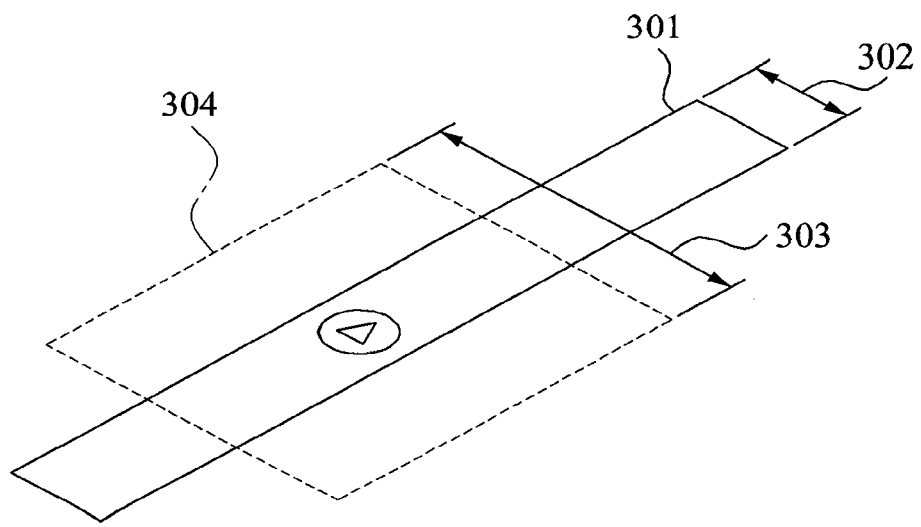
FIG. 3 is a diagram illustrating an example of determining a culling area based on road information.

FIG. 3 is a diagram illustrating an example of determining a culling area based on road information. FIG. 3 illustrates an example of determining a rectangular culling area in a navigation environment. That is, a rectangular area 304 is determined as the culling area. The rectangular area 304 has a length 303, calculated by providing a weight for a width 302 of a road 301, as a side. In this instance, data may be converted and displayed to enable at least a portion of objects included in the culling area or at least a portion of an object of the objects to be removed or blended. Accordingly, navigation information may be prevented from being obstructed from view. Also, the calculated length 303 may dynamically vary with respect to a fixed weight based on road information such as information about a width of a road. Accordingly, the culling area may automatically change depending on the road, and an object may be efficiently displayed.

Figure 4:
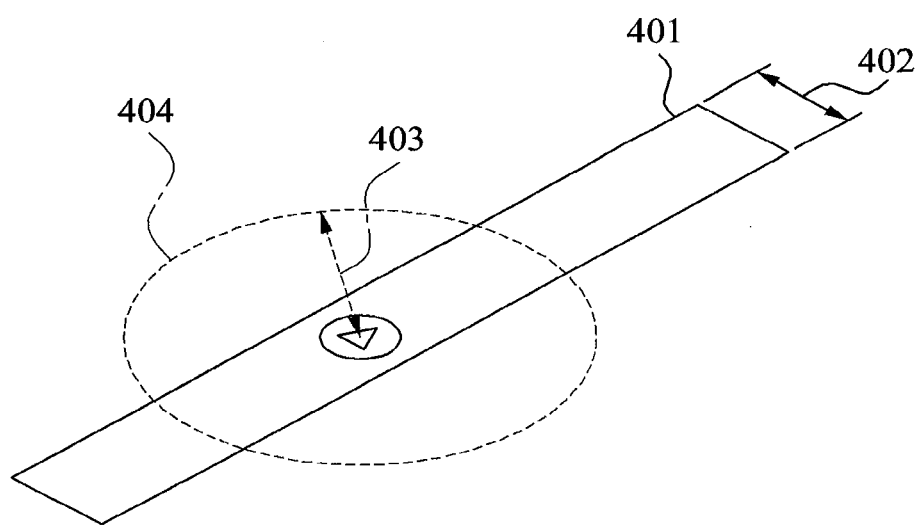
FIG. 4 is a diagram illustrating another example of determining a culling area based on road information.

FIG. 4 is a diagram illustrating another example of determining a culling area based on road information. FIG. 4 illustrates an example of determining a circular area 404 as a culling area. The circular area 404 has a length 403, calculated by providing a weight for a width 402 of a road 401, as a radius. All types of figures such as a circle, a lozenge, a rectangle as illustrated in FIG. 3, and the like may be used as the culling area. Also, a 3D concept may be applied to the culling area, and thus a solid figure may be used as the culling area.

Figure 5:
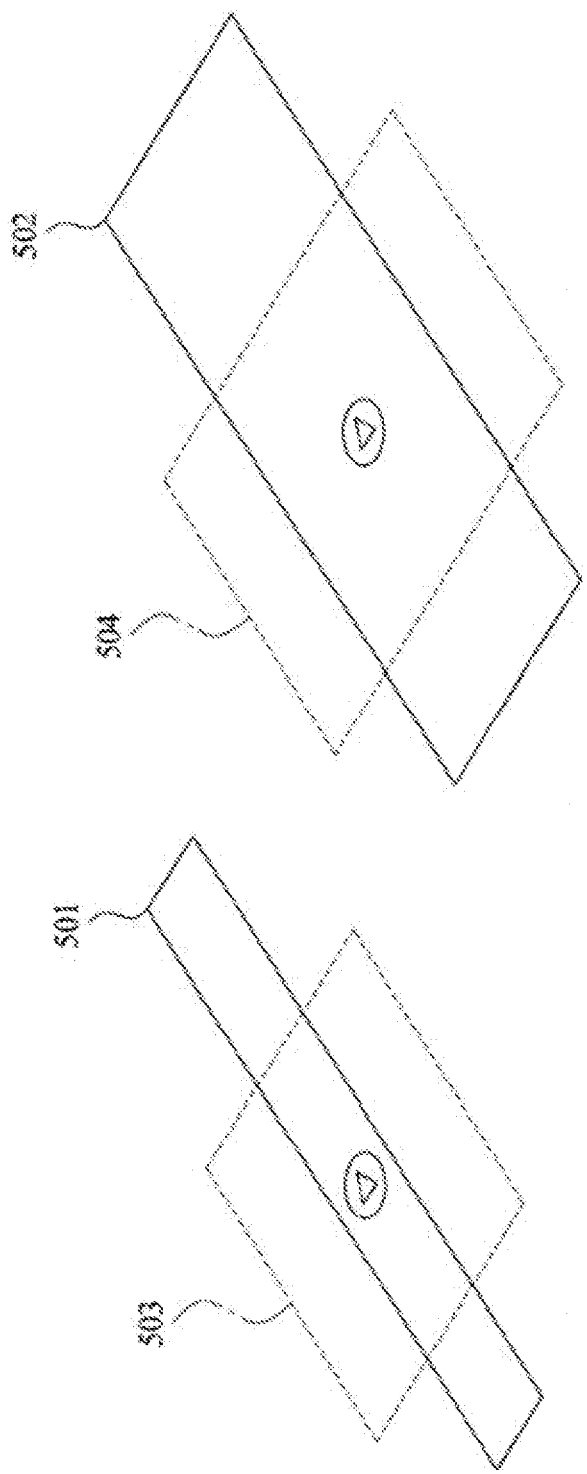
FIG. 5 is a diagram illustrating an example of a culling area determined based on a width of a road.

FIG. 5 is a diagram illustrating an example of a culling area determined based on a width of a road. Although a weight is not set depending on a road as described with reference to FIG. 3, a culling area 503 of a road 501 and a culling area 504 of a road 502 may have different widths depending on different widths of the roads 501 and 502. Accordingly, data of objects included in a smaller area may be converted in a road with a small width, and data of objects included in a larger area may be converted in a road with a great width. Thus, objects such as a building, mountain, hill, and the like may be efficiently displayed without obstructing an area where navigation information is displayed from view.

Figure 6:
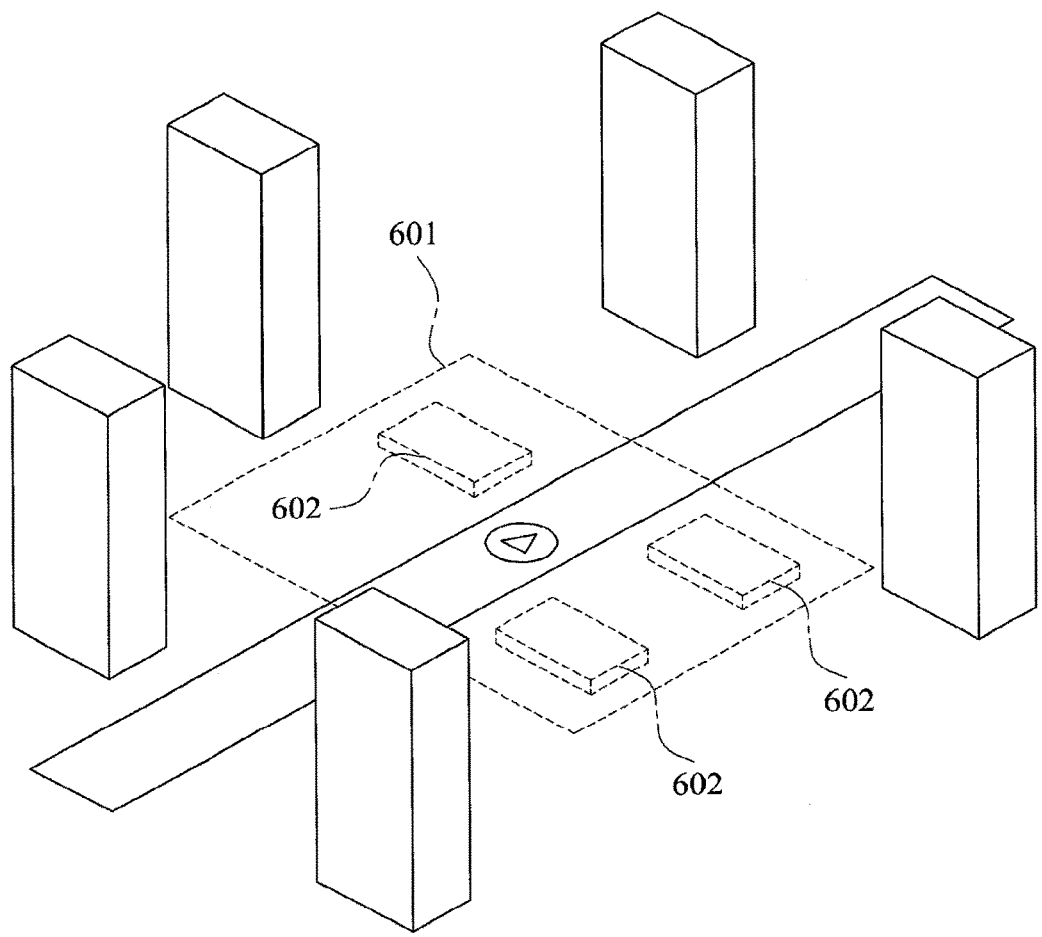
FIG. 6 is a diagram illustrating an example of a screen where a portion of each object included in a culling area is removed.

FIG. 6 is a diagram illustrating an example of a screen where a portion of each object included in a culling area 601 is removed. Only bottom sides of buildings 602 included in the culling area 601 are displayed in FIG. 6. In this instance, only a portion of objects, obstructing an area where navigation information is displayed from view, may be removed without removing all the buildings 602 included in the culling area 601. Data of the buildings 602 may be converted for the removing.

Figure 7:
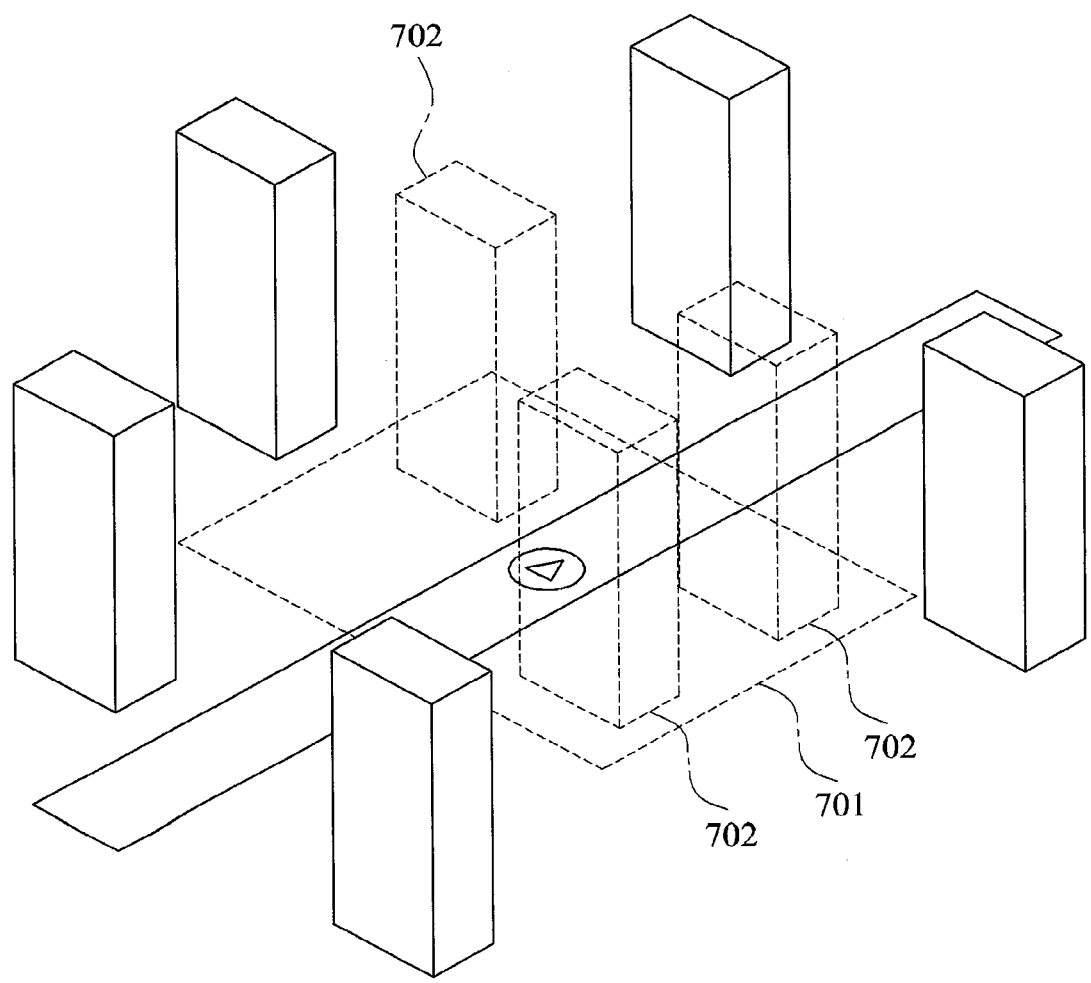
FIG. 7 is a diagram illustrating an example of a screen where objects included in a culling area are blended.

FIG. 7 is a diagram illustrating an example of a screen where objects included in a culling area 701 are blended. It is illustrated that buildings 702 included in the culling area 701 are blended without obstructing an area where navigation information is displayed from view in FIG. 7.

Figure 8:
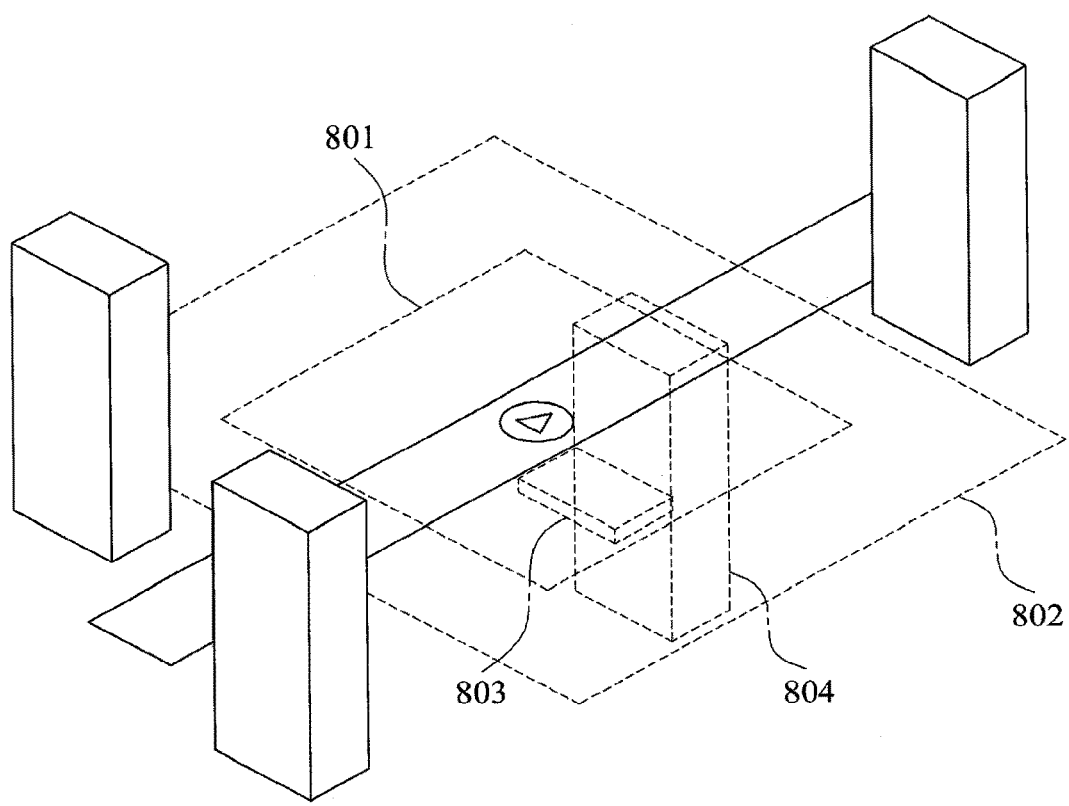
FIG. 8 is a diagram illustrating an example of a screen where different conversions are applied depending on divided areas.

FIG. 8 is a diagram illustrating an example of a screen where different conversions are applied depending on divided areas. It is illustrated that a culling area is divided into a first area 801 and a second area 802 in FIG. 8. The second area 802 is an area excluding the first area 801 from the culling area. A portion of a first building 803 included in the first area 801 is removed and only a bottom side of the first building 803 is displayed in FIG. 8. Also, a second building 804 in the second area 802 is blended in FIG. 8. As described above, the culling area may be divided into a plurality of areas and different conversions may be applied to each of the plurality of areas, and thus objects may be efficiently displayed.

Figure 9:
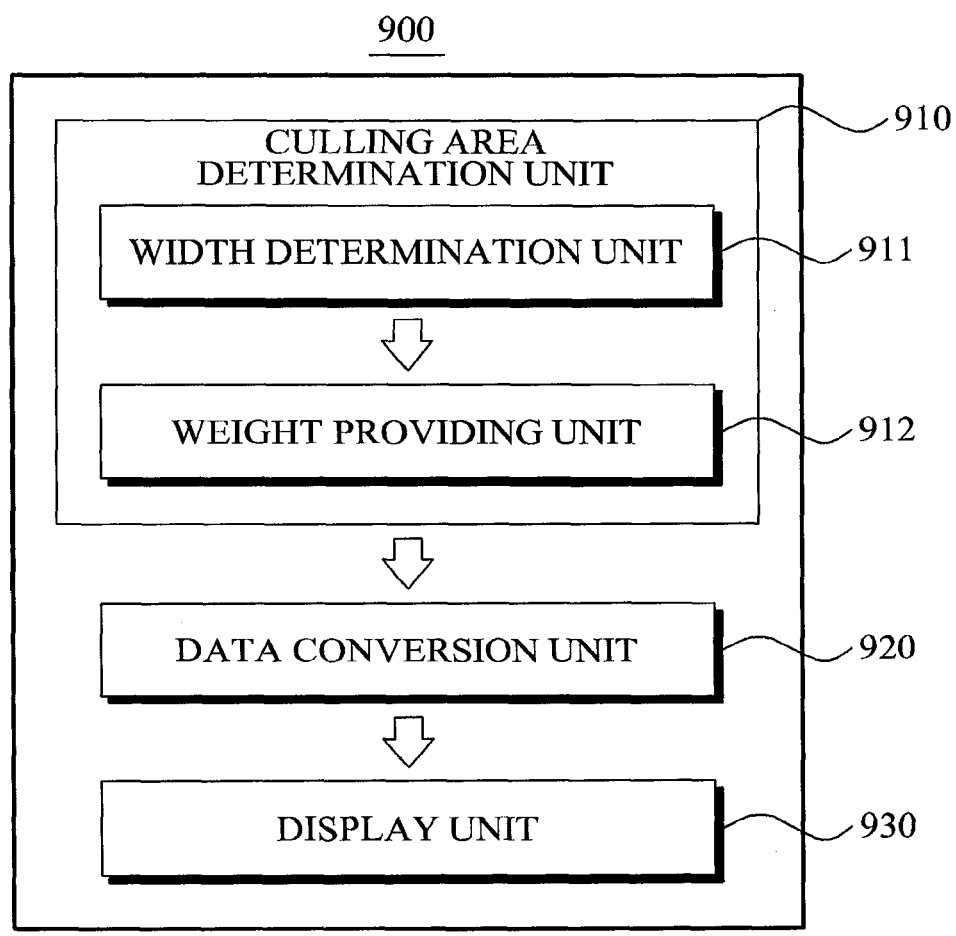
FIG. 9 is a block diagram illustrating a configuration of a display system according to an embodiment of the present invention.

FIG. 9 is a block diagram illustrating a configuration of a display system 900 according to an embodiment of the present invention. As illustrated in FIG. 9, the display system 900 may include a culling area determination unit 910, data conversion unit 920, and display unit 930. In this instance, an area division unit, not illustrated in FIG. 9, may be further included in the display system 900.

The culling area determination unit 910 may determine a culling area based on road information. The road information may include information about at least one of a width and a lane of a road. That is, the culling area determination unit 910 may determine the culling area based on the width or the lane of the road. For example, as the width of the road increases or a number of lanes of the road increases, the culling area may be determined to increase.

In this instance, the culling area determination unit 910 may determine, as the culling area, an area corresponding to a virtual figure that may be generated based on the road information. For example, the culling area determination unit 910 may determine an area of a square as the culling area. The square may have a side with a length where a predetermined weight is provided for the width of the road. Also, the culling area may be determined as a cube or an area corresponding to a hemisphere on a condition that the culling area is in 3D. In this instance, the cube may start from ground level and have the weighted length as a side, and the area corresponding to the hemisphere may start from ground level and have the weighted length as a radius. That is, the culling area may be determined as all virtual figures that may be generated based on the road information.

As an example, the culling area may be determined based on a particular point such as a location of a vehicle in a navigation environment. That is, the culling area may be determined based on the road information and the location of the vehicle, and the culling area determination unit 910 may change the culling area based on a location change of the vehicle. Specifically, since the location of the vehicle continuously changes in the navigation environment, the culling area may change based on a change of the location of the vehicle.

The culling area determination unit 910 may include a width determination unit 911 and a weight providing unit 912 as illustrated in FIG. 9.

The width determination unit 911 may determine a width of a road where the vehicle is driving. In this instance, the width determination unit 911 may directly determine the width of the road using map data including information about a width of a road, or calculate the width of the road based on information about a lane of the road. The information about the lane of the road may be obtained from the map data.

The weight providing unit 912 may provide a predetermined weight for the determined width. In this instance, the culling area determination unit 910 may determine the culling area based on the weighted width and the location of the vehicle. For example, when the determined width is 18 m, the culling area determination unit 910 may determine, as the culling area, a rectangular area having a side of 28 m and a center corresponding to the location of the vehicle. The length of the side, 28 m, may be obtained by summing the determined width, 18 m, and 10 m which is previously set as the weight. The predetermined weight may be set as necessary. Also, the culling area determination unit 910 may determine a circular area or an area corresponding to a space figure as the culling area. The circular area may have the weighted width as a radius, and the space figure may have the weighted width as a side and start from ground level. Also, the culling area determination unit 910 may determine an area corresponding to a space figure as the culling area. In this instance, the area corresponding to the space figure may start from ground level and be based on a circular figure having the weighted width as a radius. That is, all areas corresponding to the virtual figure that may be generated based on the road information may be determined as the culling area as described above.

The data conversion unit 920 may convert data of at least a portion of objects displayed on the culling area. In this instance, at least the portion of the objects may include an object obstructing the road from view. That is, data of all objects included in the culling area may be converted, or the object obstructing the road from view may be selected from all the objects and data of the selected object may be converted. For this, the data conversion unit 920 may convert the data to enable at least the portion of the objects to be removed. Specifically, the display system may prevent the objects included in the culling area from being displayed, and also convert the data to enable at least the portion of the objects to be removed to obtain a view. For example, a single building included in the culling area may be entirely removed, and only a portion of the building may be removed to prevent the road from being obstructed from view. Also, the data conversion unit 920 may convert the data to enable at least the portion of the objects to be blended without removing.

Also, the display system may further include the area division unit dividing the culling area into a plurality of areas. When the culling area is divided, the area division unit may differently convert the data depending on each of the divided areas. For example, when the culling area is divided into two areas, the area division unit may apply a data conversion for removing at least the portion of the objects to an area of the two areas, and apply a data conversion for blending at least the portion of the object to another area.

In this instance, the plurality of areas may be generated by providing weights different from each other for the width of the road. For example, when the culling area is a rectangular area determined by providing the predetermined weight, 10 m, for the width of the road, the culling area may be divided into two areas. The two areas may be two rectangular areas generated by providing a weight of 5 m for the width of the road.

The display unit 930 may display at least the portion of the objects based on the converted data. Specifically, the display unit 930 may convert data obstructing particular information from view and display at least the portion of the objects on a map screen based on the converted data. Accordingly, the display unit 930 may efficiently display the object to enable the particular information to be completely displayed.

According to an embodiment of the present invention, a display method and system may determine a culling area based on road information such as a width and a lane of a road, convert data of at least a portion of objects included in the determined culling area to enable at least the portion of the objects to be removed or blended, and thereby may prevent the road to be guided from being obstructed from view and efficiently display the objects. Also, the display method and system may determine a process of generating the objects such as a building depending on the width of the road using a virtual figure that may be generated based on the road information, and thereby may efficiently display the objects.

Also, the display method and system may divide the culling area into a plurality of areas, remove a portion of an object with respect to an area adjacent to a road and blend a portion of an object with respect to an area far away from the road, and thereby may efficiently display the objects.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A display system for a vehicle, comprising a processor configured to implement:
a culling area determination unit to determine a culling area based on a location of the vehicle;
a data conversion unit to convert data of at least a portion of objects displayed on the culling area;
a display unit to display at least the portion of the objects based on the converted data; and
an area division unit to divide the culling area into a plurality of culling areas,
a width determination unit to determine the width of the road;
a weight providing unit to provide the predetermined weight for the determined width;
wherein the culling area determination unit changes the culling area based on a change of the location of the vehicle and information about the width of the road and information about the predetermined weight for the determined width, and the data conversion unit differently converts data of an object depending on the divided culling area.

2. The display system of claim 1, wherein the culling area determination unit determines the culling area based on road information,
wherein the road information includes information about at least one of a width and a lane of a road, and
the width of the road increases or a number of lanes of the road increases, the culling area is determined to be larger.

3. The display system of claim 2, wherein the culling area determination unit determines an area corresponding to space figure capable of being generated as the culling area based on the road information.

4. The display system of claim 1, wherein the culling area determination unit comprises a width determination unit to determine a width of a road.

5. The display system of claim 4, wherein the culling area determination unit comprises a weight providing unit to provide a predetermined weight for the determined width.

6. The display system of claim 5, wherein the culling area determination unit determines a rectangular area as the culling area, the rectangular area having the weighted width as a side.

7. The display system of claim 5, wherein the culling area determination unit determines a circular area as the culling area, the circular area having the weighted width as a radius.

8. The display system of claim 1, wherein the culling area determination unit determines an area corresponding to a space figure as the culling area, the space figure comprises a 3D space figure.

9. The display system of claim 5, wherein the culling area determination unit determines an area corresponding to a space figure as the culling area, the space figure starts from ground level and is based on a circular figure having the weighted width as a radius.

10. The display system of claim 1, wherein the data conversion unit converts the data to enable at least a portion of each of at least the portion of the objects to be removed.

11. The display system of claim 1, wherein the data conversion unit converts the data to enable at least a portion of each of at least the portion of the objects to be blended.

12. The display system of claim 1, wherein the different conversion includes data conversion to remove at least a portion of objects and data conversion to blend at least the portion of the objects.

13. The display system of claim 1, wherein the culling area determination unit determines an area corresponding to a space figure as the culling area having a center corresponding to the location of the vehicle.

14. The display system of claim 1, wherein the area division unit divides the culling area based on a distance from the vehicle.

15. The display system of claim 1, wherein the culling area determination unit comprises the weight providing unit provides different weights to the divided culling areas.

16. A display method for a vehicle, comprising:
determining a culling area based on a location of the vehicle;
dividing the culling area into a plurality of culling areas;
differently converting data of at least a portion of objects displayed on the divided culling area depending on the divided culling area; and
displaying at least the portion of the objects based on the converted data,
determining the width of the road;
providing the predetermined weight for the determined width;
wherein the determining a culling area changes the culling area based on a change of the location of the vehicle and information about the width of the road and information about the predetermined weight for the determined width.

17. The display method of claim 16, wherein the determining a culling area determines the culling area based on road information,
wherein the road information includes information about at least one of a width and a lane of a road, and the width of the road increases or a number of lanes of the road increases, the culling area is determined to be larger.

18. The display method of claim 17, wherein the determining a culling area determines an area corresponding to a space figure capable of being generated as the culling area based on the road information.

19. The display method of claim 16, wherein the determining a culling area comprises:
determining a width of a road; and
providing a predetermined weight for the determined width.

20. The display method of claim 19, wherein the determining a culling area determines a rectangular area as the culling area, the rectangular area having the weighted width as a side.

21. The display method of claim 19, wherein the determining of the culling area determines a circular area as the culling area, the circular area having the weighted width as a radius.

22. The display method of claim 16, wherein the determining of the culling area determines an area corresponding to a space figure as the culling area, the space figure comprises a 3D space figure.

23. The display method of claim 16, prior to the differently converting data of at least a portion of objects, further comprising:
determining areas, each of the areas corresponding to a space figure, as the divided culling areas, each of the divided culling areas having a center corresponding to the location of the vehicle.

* * * * *